L. I. Ware,
Belt Fastening,
№ 8,099. Patented May 20, 1851.
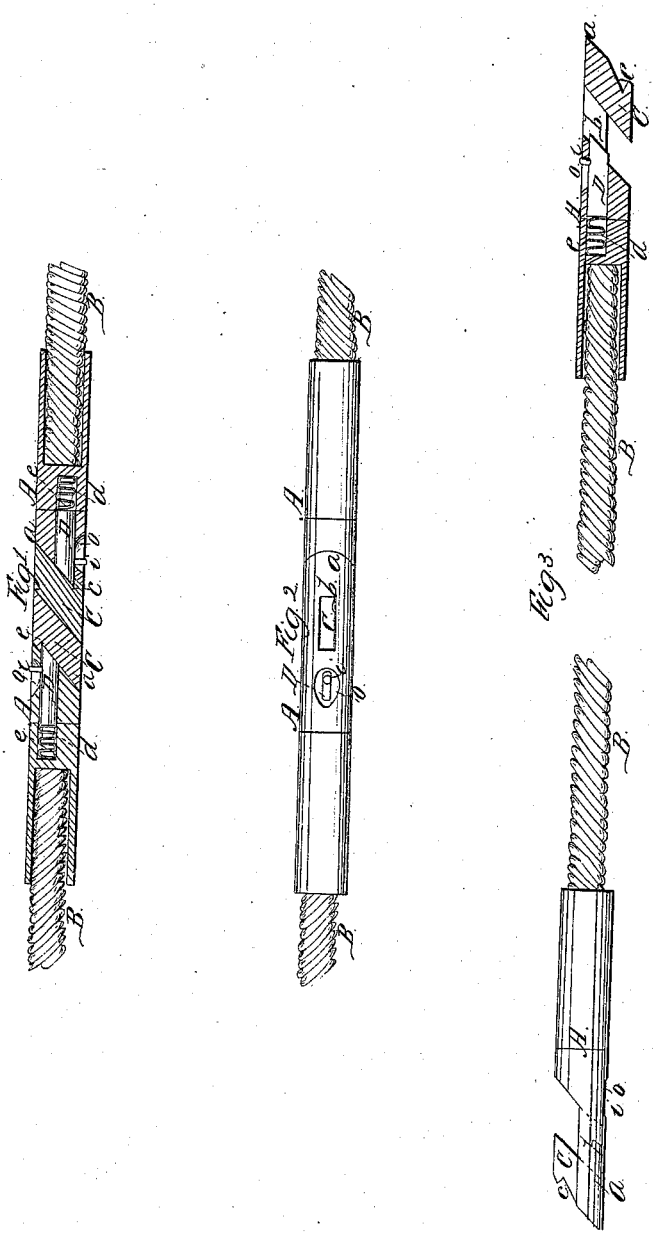

UNITED STATES PATENT OFFICE.

LAWTON I. WARE, OF WARREN, RHODE ISLAND.

COUPLING FOR CORDS.

Specification of Letters Patent No. 8,099, dated May 20, 1851.

*To all whom it may concern:*

Be it known that I, LAWTON I. WARE, of Warren, in the county of Bristol and State of Rhode Island, have invented a new and Improved Coupling for Uniting Cords, Ropes, Rods, or Chains and which Improved Coupling is particularly applicable for "Check-Strings" in trains of railway and other carriages; and I do hereby declare that the following is a full, clear, and exact description of the same, reference being had to the accompanying drawings, forming part of this specification, in which—

Figure 1, is a longitudinal section of the coupling in gear or locked, and shown to unite the two ends of one cord, or the ends of two separate cords. Fig. 2, is a longitudinal view of the same, representing a top view or plan in relation to the position occupied by Fig. 1, and Fig. 3, is a longitudinal view of a cord or rope of any desired length, with the parts forming the coupling attached to either end, one half or part of the coupling at one end, being shown in section.

The same letters of reference denote similar parts throughout each of the several figures.

The nature of my invention refers to the use of two half or part couplings of similar formation, attached (one half at either end) to the ends of cords, ropes, rods, or chains, or to the end or ends of similar appliances, for the purpose of connecting and uniting them, and consists, in constructing each half or part coupling with a lip, having a slot, and projecting beveled hook containing a notch, or crevice, into which a bolt, acted upon by a spring, catches or slides, the hooks of the two half couplings lapping one against the other, entering the slots in the lips, and retained from yielding, or breaking loose, by the bolts shot into the notches, or crevices, of the two hooks.

To enable others skilled in the art to make and use my invention, I will proceed to describe its construction and operation.

A, A, are two half couplings secured or attached to the ends of a cord or rope, B, B, (Fig. 3) or to the end or ends of cords or ropes, B, B, (Figs. 1 and 2), in any suitable way.

$a, a$, are the lips of the half couplings of a semi-round shape in their transverse section, and beveled or sloped off at their extremities, the half couplings also similarly sloped or beveled for half of their diameter at their junction with the lips $a, a$; which have slots, or openings, $b, b$, passing through them at an angle or slope, and hooks C, C, projecting from them, of a thickness equal, or nearly so, to the width of the slots $b, b$, and standing at a similar angle, or slope, to the end boundary lines of the slots $b, b$. The hooks C, C, have notches, or crevices, $c, c$; and D, D, are sliding bolts, working in passages $d, d$, containing spiral springs $e, e$, or other suitable shaped springs, pressing on the bolts D, D, which have nibs or projecting pins $i, i$, sliding in openings or slots O, O, in the half couplings A, A.

The operation, in further description, is as follows—the hooks C, C, fit into the slots $b, b$, their ends or edges lapping one against the other (as seen in Fig. 1,) the lips $a, a$, of the two half couplings meeting and the beveled extremity, of either one lip, fitting against the beveled or sloped portion, of either one half coupling A, A, at their junction with the lips $a, a$; the sliding bolts D, D, pressed by the spring $e, e$, shooting into the notches $c, c$, and locking or uniting the two half couplings A, A; which when required to loose, or open, may be done, by drawing back the bolts D, D, through means of the nibs $i, i$, and sliding out the hooks C, C, from their slots $b, b$.

By this improved mode of coupling, or connecting cords, ropes, or other similar appliances; any desired number of lengths, pieces, or series of lengths, may be united by providing the ends of each length with half couplings such as already described; and where applied to "check strings" of railway, or other trains, of carriages linked together, peculiar and important advantages are obtained, in procuring a ready communication from the inside of each, or any, car or vehicle, to the driver or conductor, or enabling the conductor to signalize the driver without the loss of time, and exposure now experienced, in operating the check string from the outside, which advantage is procured by the facility offered through the half couplings, on the ends of the several lengths of rope, or cord, being each similar to the other, so that, any two half couplings will fit together, and the number of cars in the train may be lessened, or increased, without any material delay in reestablishing the "check string" communication; and the form or construction of the coupling, as described, presents a firm and steady means of connection, not liable to be shaken loose by accident, or the vibration of the cord or rope.

What I claim as my invention and desire to secure by Letters Patent, is—

The use of half couplings A, A, (each of similar shape and construction) formed with lips $a$, $a$, having slots $b$, $b$, into which projecting hooks C, C, fit, having notches $c$, $c$, serving for the bolts D, D, to enter, and lock the coupling; or constructed and operating, for the purposes shown, in any manner substantially the same.

LAWTON I. WARE.

Witnesses:
AMASA S. WESTCOTT,
KIRK GRISWOLD, Jr.